United States Patent [19]
Dlouhy

[11] Patent Number: 5,178,344
[45] Date of Patent: Jan. 12, 1993

[54] VTOL AIRCRAFT

[76] Inventor: Vaclav Dlouhy, 6561 Frietchie Row, Columbia, Md. 21045

[21] Appl. No.: 759,515

[22] Filed: Sep. 13, 1991

[51] Int. Cl.$^5$ .............................................. B64C 29/00
[52] U.S. Cl. .................................. 244/12.2; 244/12.4; 244/23 C; 244/73 B
[58] Field of Search ...................... 244/12.1, 12.2, 12.4, 244/23 C, 26, 73 B, 73 C; 416/108, 110, 111, 119

[56] References Cited

U.S. PATENT DOCUMENTS

| | | | |
|---|---|---|---|
| D. 171,509 | 2/1954 | Lightbourn | 244/23 C |
| 1,401,461 | 12/1921 | Chaddock | 244/26 |
| 1,601,670 | 9/1926 | Bergman | 416/111 |
| 2,081,381 | 5/1937 | Oehmichen | 244/26 |
| 2,646,130 | 7/1953 | Udelman | 416/110 |
| 3,031,157 | 4/1962 | Varden | 244/12.4 |
| 3,096,047 | 7/1963 | Dunn, Jr. | 244/26 |
| 3,167,273 | 1/1965 | Calderon | 244/12.4 |
| 3,614,030 | 10/1971 | Moller | 244/23 C |
| 3,752,419 | 8/1973 | Richter | 244/23 C |
| 4,023,751 | 5/1977 | Richard | 244/23 C |
| 4,457,476 | 7/1984 | Andresevitz | 244/23 C |
| 4,469,294 | 9/1984 | Clifton | 244/12.3 |
| 4,757,962 | 7/1988 | Grant | 244/12.3 |

FOREIGN PATENT DOCUMENTS

| | | | |
|---|---|---|---|
| 51694 | 8/1974 | Australia | 244/23 C |
| 889177 | 12/1971 | Canada | 244/12.2 |
| 1406518 | 1/1969 | Fed. Rep. of Germany | 244/12.4 |

Primary Examiner—Joseph F. Peters, Jr.
Assistant Examiner—Anne E. Bidwell
Attorney, Agent, or Firm—Morton J. Rosenberg; David I. Klein

[57] ABSTRACT

A VTOL aircraft (100) is provided having a plurality of rotor blade sets (2) disposed at least partially beneath the fuselage (1). The aircraft is propelled vertically by means of the thrust generated from the rotating sets of rotor blades (2), and augmented by suction generated aerodynamic lift. At least a portion of the suction airflow (A) is displaced from the upper surface of fuselage (1), creating a region of low pressure. The negative pressure, or suction generated from the portion of the rotor blades (2) disposed beneath the fuselage (1) causes a column of air to be accelerated upwardly toward the central portion of the fuselage bottom surface (205). The upwardly directed airflow (R) contacts the fuselage bottom surface (205) and flows thereacross toward respective rotor blades (2), generating a layer of high pressure air in juxtaposition with the lower surface (205) of fuselage (1). The pressure differential between the upper and lower surfaces of fuselage (1) provides an aerodynamic lift which augments the thrust generated by the rotor blades (2).

21 Claims, 6 Drawing Sheets

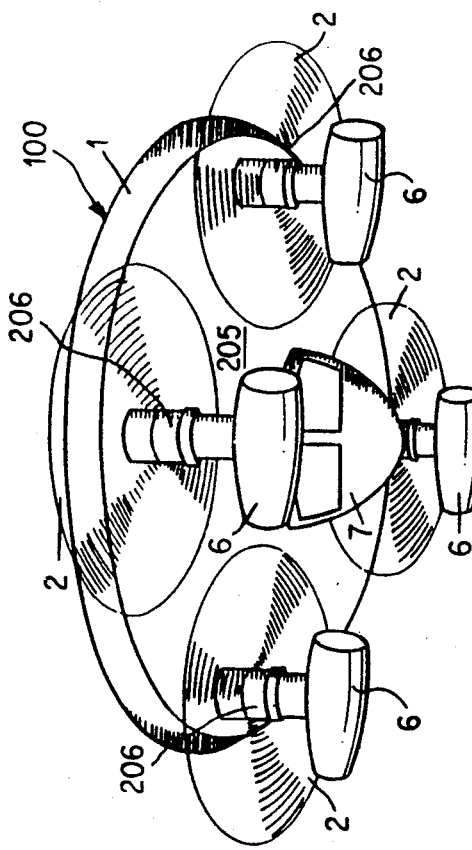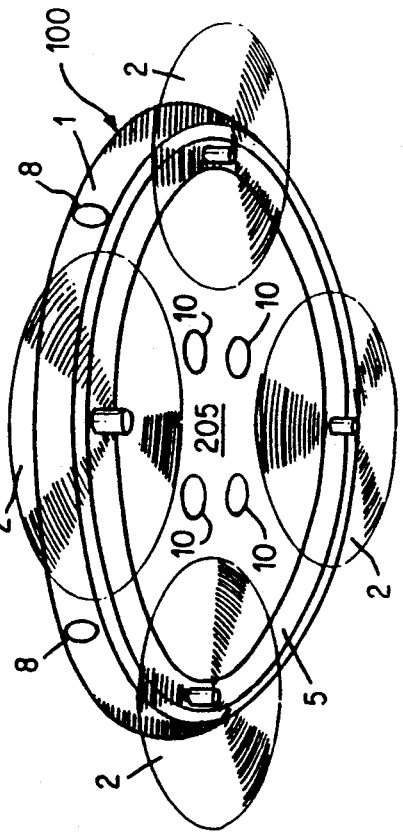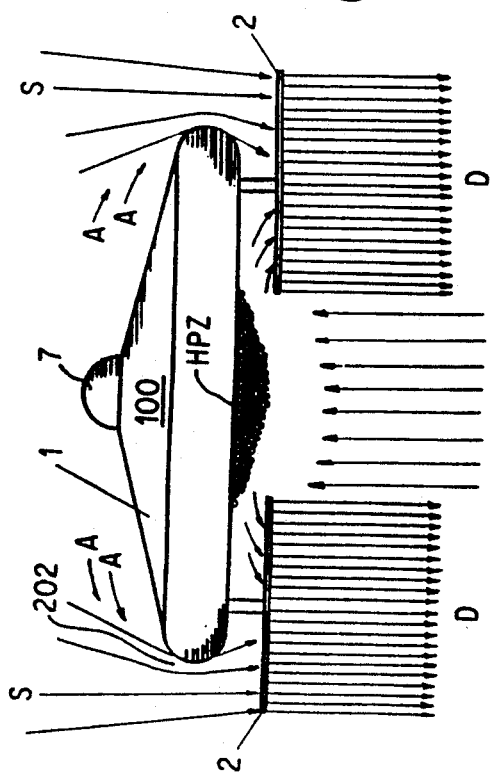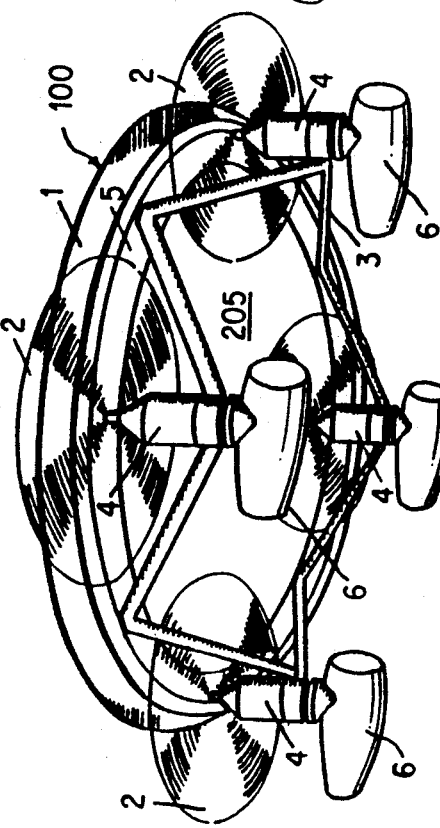

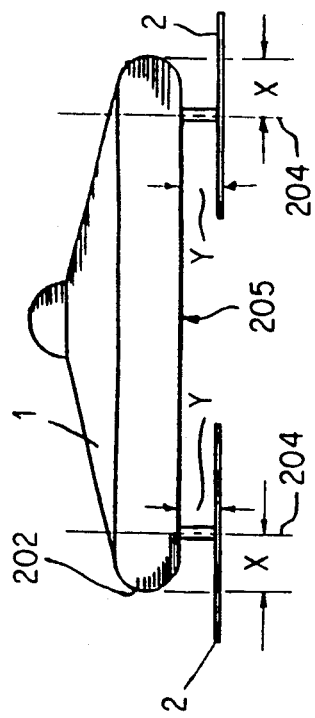
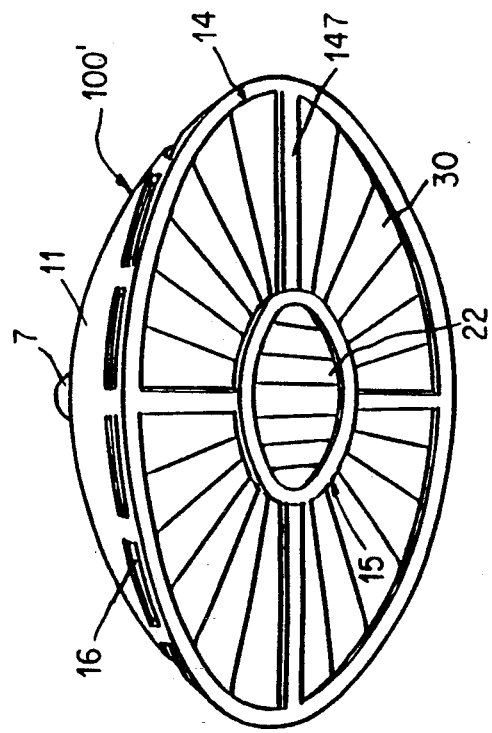
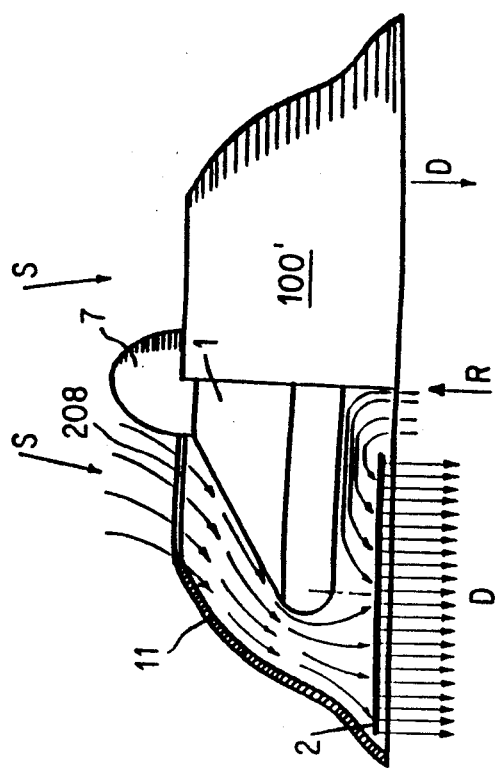
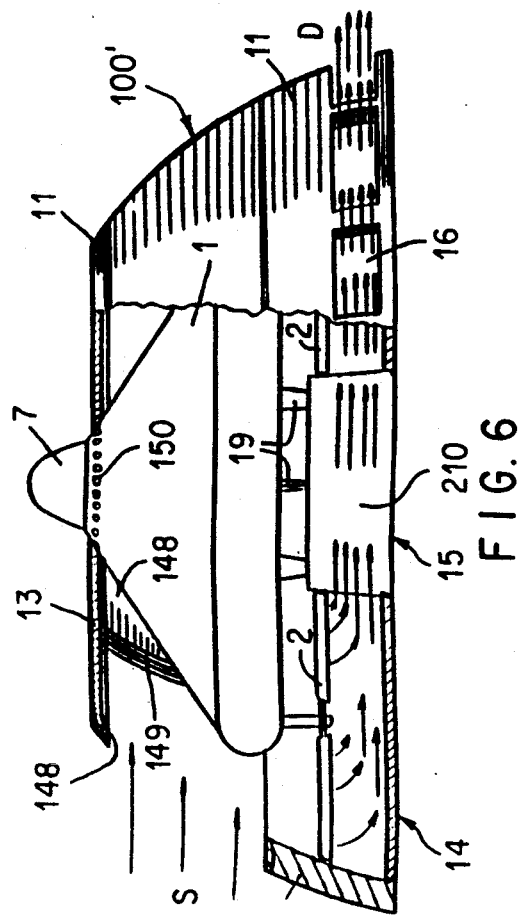

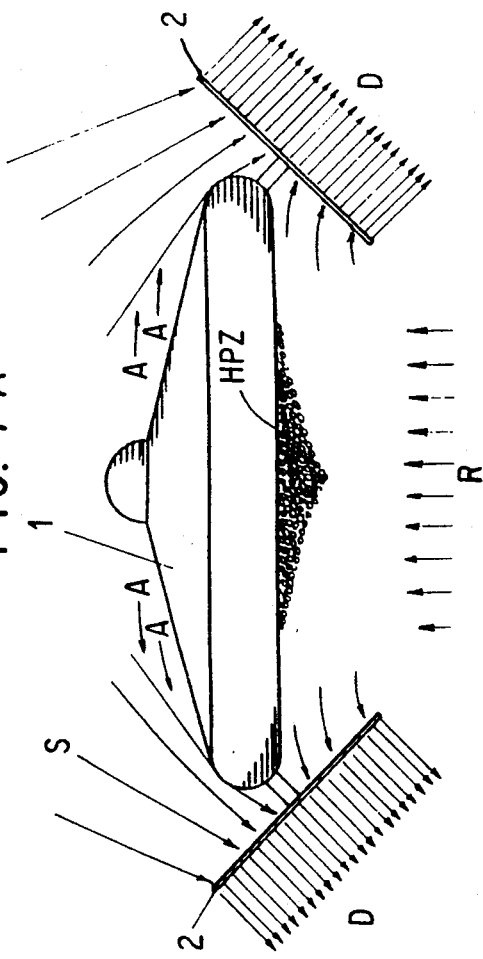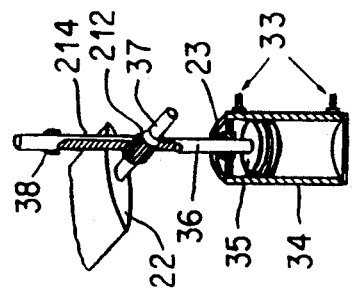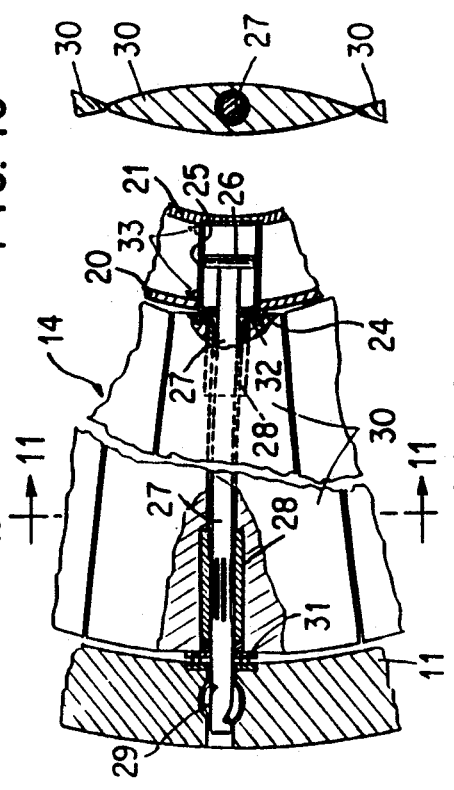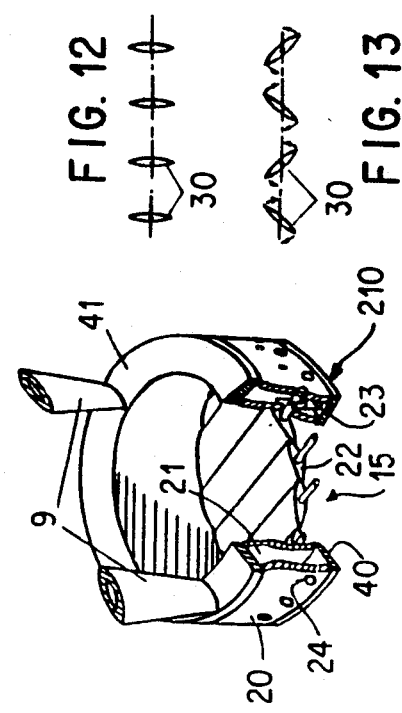

VTOL AIRCRAFT

BACKGROUND OF THE INVENTION

1. Field of the Invention

This invention directs itself to aircraft systems for vertical take-off and landings. In particular, this invention directs itself to a VTOL aircraft having vertical thrust augmented by suction generated aerodynamic lift. Further, this invention is directed to a VTOL Aircraft having a plurality of rotors extending beneath a portion of the fuselage for displacing air downwardly therefrom. More in particular, a portion of the airflow on the suction side of the rotor blades is displaced from above the fuselage for creating a low pressure region thereabove. The remaining portion of the suction airflow is drawn from a central portion of the underside of the fuselage, thereby creating an updraft of rising air which is accelerated by the rotor blade suction so as to contact the fuselage bottom surface and flow thereover to create a high pressure region in juxtaposition therewith. The low pressure region on the upper surface of the fuselage and the high pressure layer on the bottom surface, together in combination provide an aerodynamic lift.

2. Prior Art

Vertical take-off and landing aircraft are well known in the art. The best prior art known to the Applicant is disclosed in U.S. Pat. Nos. 1,405,035; 1,816,707; 3,752,417; 3,117,747; 3,054,578; 3,525,485; 3,172,116; 3,424,404; 3,372,891; 4,187,999; 4,941,628; 2,967,029; 4,202,518; 3,829,043; 2,308,477; 3,514,053; 2,912,188; 3,155,342; 3,199,809; 3,633,849; 3,767,141; 3,414,077; 2,922,277; 3,278,138; 3,284,027; 3,469,804; and, 3,632,065.

In some prior art systems, such as that disclosed in U.S. Pat. No. 1,405,035, aircraft are disclosed which are capable of ascending and descending vertically. In such systems a rotor may be mounted beneath the fuselage to provide the lifting power for a vertical ascent, or for controlling the vertical descent. However, such systems do not disclose or suggest the augmentation of the lifting thrust using suction generated aerodynamic lift.

In other systems, such as that disclosed in U.S. Pat. Nos. 1,816,707 or 3,752,417, vertical take-off and landings are made possible by propeller generated lift. The rotor blades are disposed in duct-like structures formed in the fuselage, for directing the airflow downward to create the thrust utilized to lift the aircraft. Here again, such fans are not augmented by suction generated aerodynamic lift, as provided by the instant invention.

In another prior art system shown in U.S. Pat. No. 2,912,188 engine thrust output is selectively changed between horizontal and vertical directions. However, the weight to lift ratio has been found to be unacceptably low and fuel consumption and noise levels are high. As in previously described references the vertical thrust is not augmented by the suction generated aerodynamic lift.

SUMMARY OF THE INVENTION

A VTOL aircraft is provided having a fuselage whose upper and lower surfaces together form a predetermined surface contour defining a lifting body. The VTOL aircraft further includes at least one propulsion assembly coupled to the lower surface of the fuselage for displacing the aircraft in a substantially vertical direction by (1) displacing air from the area juxtaposed to the upper surface of the fuselage, and (2) displacing air for contact with a central portion of the lower surface of the fuselage. Thus, a low pressure region is formed above the fuselage and a high pressure region is formed adjacent the central lower surface portion of the fuselage to create an aerodynamic lifting force.

BRIEF DESCRIPTION OF THE DRAWINGS

FIG. 1 is a schematic view of the VTOL aircraft;

FIG. 2 is a perspective view of one configuration of a first embodiment of the VTOL aircraft;

FIG. 3 is a perspective view of an alternate configuration of the first embodiment of the VTOL aircraft;

FIG. 4 is a perspective view of a second alternate configuration for the first embodiment of the VTOL aircraft;

FIG. 5 is a schematic view for a second embodiment of the VTOL aircraft;

FIG. 6 is an elevation view in partial cutaway of the second embodiment of the VTOL aircraft;

FIG. 7 is a schematic view of the VTOL aircraft showing dimensional relations;

FIG. 7A is an elevational schematic view of the VTOL aircraft showing the rotors inclined at a predetermined angle;

FIG. 8 is a perspective view of the second embodiment of the VTOL aircraft;

FIG. 9 is an enlarged detail of the rising air directing structure for the second embodiment of the VTOL aircraft;

FIG. 10 is an enlarged detail of the closure system for the downwash air channel;

FIG. 11 is a cross-sectional view of the shutter panel taken along the section line 11—11 of FIG. 10;

FIG. 12 is a schematic diagram of the shutter panels in an open condition;

FIG. 13 is a schematic diagram of the shutters in a partially closed condition;

FIG. 14 is an enlarged detail of the return air shutter servosystem;

DESCRIPTION OF THE PREFERRED EMBODIMENTS

Figure 15:
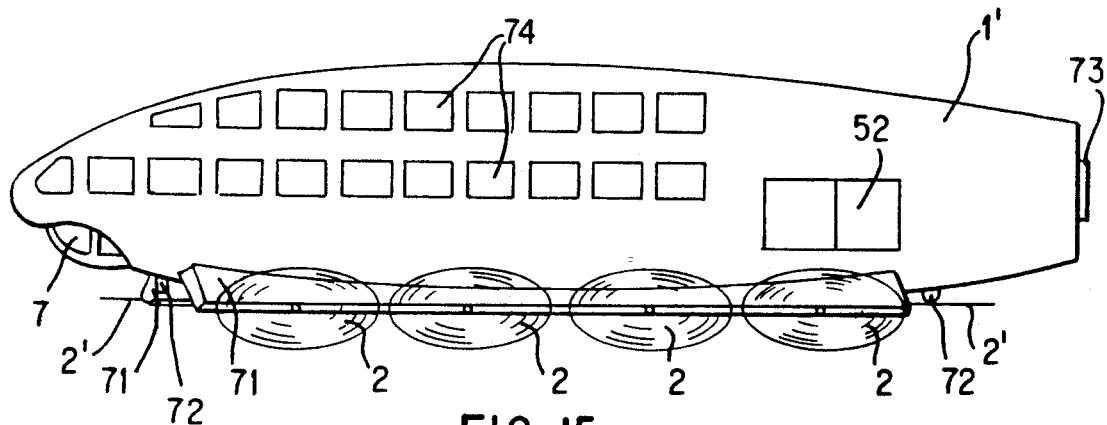
FIG. 15 is an elevation view of an embodiment of the VTOL aircraft having an elongated fuselage.

Referring to the Figures, there is shown VTOL aircraft 100 having at least four rotor blade sets 2 rotatively driven beneath at least a portion of the fuselage 1 for producing suction generated aerodynamic lift. As will be seen in following paragraphs, VTOL aircraft 100 is specifically directed to the concept of providing an aircraft and propulsion system combination wherein the engine thrust is augmented by aerodynamic lift for propelling the aircraft in a vertical direction. The augmented lift being a byproduct of the thrust generation and the fluid flow path of the air being drawn by the rotor blades 2. The contour of fuselage 1 is that of a lifting body, such that in transition to horizontal flight, sufficient air is displaced over the fuselage surfaces to create conventional aerodynamic lift. The vehicle thereby transitioning from engine borne lift to the equivalent of wing borne lift, by virtue of the lifting body fuselage contour.

Horizontal propulsion may be generated through the following actions:

1. tilting one or more vertical propulsion units into a horizontal direction;
2. through application of one or more horizontal propulsion units;
3. vectoring of thrust vertical propulsion units; and/or;
4. directing suction and discharge air in a horizontal direction by means of providing the suction mantle with discharge and intake orifices as well as throttling and closing devices.

Although not restricted to military or commercial aircraft applications, VTOL aircraft 100 is particularly adapted to conveying passengers between selected sites, which may not be accessible to standard fixed wing aircraft, while providing safer, more efficient, and higher speed transportation than available utilizing helicopters. The disclosed principle of suction generated aerodynamic lift is applicable to a large variety of aircraft designs and configurations, each particularly adapted for a respective intended application, such as search and rescue, surveillance, commercial cargo, commercial passenger service, or the like.

The provision of rotor blades 2 for generating vertical lift and use of jet engines for propulsion once the aircraft 100 is positioned at the desired flight altitude and provides significant advantages for take-off and landing at inter-city airports. Since the jet engines are not used for taking-off or landing, there is a lower level of noise emitted by the aircraft. Since the rotor blades 2 extend beneath the fuselage 1, the hot engine exhaust gases can be directed at the rotor blades, serving a deicing function in the winter months.

Vertical ascent to a cruising altitude as well as a vertical landing substantially eliminates dangers associated with high speed take-off and landing of conventional aircraft as has been well documented in the state of the art.

An additional danger which is substantially reduced is the occurrence of windshear air currents. Since the subject VTOL aircraft of this invention concept travels through the windshear air currents in a vertical displacement, such can compensate for windshear influence by thrust readjustment of individual rotors. As is known in the art, this may be done automatically by processors and computers when attached sensors detect a deviation in the VTOL aircraft's horizontal attitude or in a preset rate of ascent or descent. Additionally, in known aircraft, a collision and intake a birds or other flying species is a disadvantage. In the manner as hereinbefore been described in the subject VTOL aircraft diminishes the possibility of bird or other flying species intake or collision. Obviously, by use of the subject VTOL aircraft any problems associated with a plurality of airplanes colliding on the same runway will be substantially diminished.

Referring now to FIGS. 1 and 7, there is shown a schematic view of the airflow patterns generated with respect to VTOL aircraft 100. The rotors 2 are driven by one or more sources of motive force, such as from turbines or piston operated engines. The rotational axis 204 for each of the sets of rotor blades 2 are located a distance X from the peripheral edge 202 of the fuselage 1. The rotor blades 2 are disposed a distance Y from the bottom surface 205 of fuselage 1. The dimension X is chosen to provide a sufficient portion of the rotor blades 2 extended beyond the fuselage peripheral edge 202 in order to draw sufficient airflow A from above the fuselage surface, for creating an area of low pressure thereat. Similarly, the location of the rotor blade 2 with respect to the bottom surface 205 of fuselage 1 is defined by dimension Y for sufficient generation of the column of upwardly directed air R of sufficient inertia to contact the bottom surface 205 and flow thereover toward a respective set of the rotor blades 2. If the rotor blades 2 are disposed too close to the bottom surface 205 of fuselage 1, the portion of the rotor blades 2 under the fuselage will be unable to generate the necessary suction to create the high velocity airflow R. Likewise, if the rotor blades 2 are disposed greater than a predetermined distance from the bottom surface 205 of fuselage 1, too little of the suction air R will contact the fuselage bottom surface 205, thereby failing to create the necessary high pressure region required to generate the augmented aerodynamic lift for augmenting the thrust generated by the rotor blades.

The new concept of suction generated aerodynamic lift takes advantage of airflow patterns A and R induced by the rotor blades 2 in conjunction with the fuselage 1. By displacing air from the upper surface of the fuselage, such creates a low pressure region in the direction which the aircraft is to be displaced. High velocity air R directed toward a central portion of the fuselage is induced by the plurality of sets of rotor blades 2 utilized for the aircraft 100. However, it will be understood that three rotors may be used although the controls are simplified and safety enhanced when a four rotor arrangement is used. A major portion of the high velocity air R will have sufficient inertia to contact the bottom surface 205 and form a high pressure layer thereon. The suction airflow S in the vicinity of the fuselage perimeter edge 202 is displaced, thereby creating a displacement of the air A above the fuselage upper surface. In this manner, air is drawn into the airstream S. By virtue of the plurality of sets of rotor blades 2, as well as the gyration thereof, to be described in following paragraphs, produces an annulus of low atmospheric pressure above the fuselage, and an annulus of discharge airflow D below the rotors 2. Likewise, the suction effect of the rotor blade portions disposed beneath the fuselage induces the suction airflow R. The suction pressure which draws the airflow R is a product of all of the sets of rotor blades 2, which provide sufficient acceleration and inertia to the airstream for creating a zone of high pressure in the central area of the lower fuselage surface 205.

In various types of aircraft without gyration, a larger number of rotors than four may be more desirable, in order to reduce gaps, between the rotors' tips. Such will undoubtedly improve efficiency of the suction generated lift by limiting the leakage between airflows of differing pressure and directional flow. Substantially complete elimination of leakage may be achieved by the gyration of the rotors.

In craft not having a suction mantle, the gyration of rotors may be used during ascent or hovering. During horizontal flight, annular plate 5 may be locked in a fixed position, to enable rotors 2 to control flight maneuvers.

Referring more in detail to FIG. 1, such schematically shows the airflow and the resulting effect on the fuselage. The suction effect of rotors 2, which are substantially equally spaced under the fuselage, and adjacent to the periphery as shown, creates airflow S and R.

The rising airflow R impinges and pushes fuselage 1 in a vertically upward direction. The airflow S, being displaced in a vertically downward direction toward rotors 2, act as a barrier for any suction of shielded portions of rotors 2, and force rotors 2 to displace or suck the air from the central zone beneath the fuselage. Airflow S is formed around the periphery of fuselage 1 by suction applied through the protruding portions of rotors 2 around the periphery of fuselage 1.

Gyration forms the airflow S and D around fuselage 1 in the overall contour of an annulus. The airflow S reduces the atmospheric pressure above fuselage 1 by displacing or sucking the air in direction A as shown in FIG. 1. The suction effect of the shielded portions of rotors 2 sucks the air from the center zone below fuselage 1. This air is instantly replaced by air being displaced from below by atmospheric pressure between the downward airflows D as shown.

Rising airflow R impinges and collides with the bottom of fuselage 1 prior to being displaced or sucked in by rotors 2.

The collision creates a zone of higher pressure HPZ below fuselage 1. The higher pressure zone is present as long as rotors 2 generate the suction displacement. The blades of rotors 2 may have adjustable pitch as is known in conventional propeller systems. In order to control flight maneuvers relating to hovering and descent of the aircraft.

The distance of the rotors 2 from the fuselage 1 is of a predetermined dimension, such that the rising airflow is maintained at its peak pressure value. When the distance is excessive, the suction effect of the shielded portions of rotors 2 would suck the air from all directions, and suction from the center zone would have a weaker effect. When the distance is too small, the quantity of air would be insufficient for proper functioning of the shielded portions of rotors 2.

It is to be understood that the graphic representation of high pressure zone HPZ is provided to merely show the positional location of the high pressure zone and not represent a limit or contour of the high pressure zone.

Referring now to FIG. 7A, there is shown a schematic view of airflow patterns generated with respect to VTOL aircraft 100. In this representation rotors 2 are tilted or inclined to a 45 degree position. Tilting of rotors to direct the suction flows S an A from the zone above the craft's center is more efficient in reducing air pressure above the aircraft. Reduced air pressure above the fuselage offers less resistance to the craft's displacement during ascent. The high pressure zone HPZ is larger or greater than in a craft with a horizontal plane of rotation of rotors 2 due to the larger passage for rising airflow R.

As is clear, the rotors are tilted or inclined after a safe distance above the ground is reached. Such must be returned to their horizontal position before horizontal flight or landing is actuated.

Referring now to FIG. 2, there is shown a first embodiment of the VTOL aircraft 100 having a saucer-shaped fuselage 1 with a substantially planar bottom surface 205, from which is suspended a sub-fuselage frame 3. The vertical thrust engines 4, which drive the rotor blades 2, are mounted to the sub-fuselage frame 3. Additionally, the sub-fuselage frame 3 supports a plurality of horizontal thrust engines 6. In this particular embodiment, the pilot's cabin 7 is located on the upper portion of the fuselage, as shown in FIG. 1, or alternately may be coupled to the bottom surface 205, or supported by the sub-fuselage frame 3, and thereby separate from the fuselage 1.

The sub-fuselage frame 3 is fixedly coupled to an annular plate member 5, disposed on the bottom surface of the fuselage. Annular plate member 5 is rotatably displaceable with respect to the bottom surface 205 of fuselage 1, such that the propulsion systems 4 and 6 rotate with respect to a central vertical axis of fuselage 1. Thus, by rotating the rotational axes of the rotor blades 2 about the circular path defined by the plate member 5, a continuous annular curtain of air is created about the central suction zone, which conducts the airflow R. The sub-fuselage frame 3 may be connected directly to the bottom surface 205 without use of annular plate 5. This may be done if the augmented lift is not needed for a particular aircraft and simplification of the overall design is preferred. Such a connection may be required when a cabin is mounted to the sub-fuselage frame 3, to avoid exposing the aircraft operators to centrifugal force, which would occur if the gyration were used. In addition to the thrust generated by the rotor blades 2, the thrust generated by the engines 6 can be directed vertically for added vertical lifting force. The thrust of the engines 6 can be directed through thrust vectoring, pivotal rotation of the engines, or a combination thereof. While engines 6 are depicted as jet type engines, obviously other sources of thrust may be utilized.

In transitioning to horizontal flight, the thrust of the vertical thrust engines 4 is reduced, while the thrust of the horizontal thrust engines 6 is increased, after their alignment with the desired flight direction.

Transition from vertical to horizontal flight requires precise control of the rotational speed of the plurality of rotor blades 2, and the pitch thereof, while at the same time adding thrust from the horizontal thrust engines 6. This process is made more complex, when it is desired to vector the aircraft at some angle with respect to the horizontal plane. Obviously, manual control of the engine thrust, providing thrust from a particular engine when it is in a particular position with respect to fuselage 1, would not be practical. Therefore, such control is handled by a computer system, wherein the thrust of the engines 4 and 6 are varied in accordance with their relative position about the fuselage 1, responsive to the selected direction in which the craft is to fly. Similarly, the pitch of the rotor blades and the RPM of the respective engines are varied in accordance with the pitch, yaw, and bank angle at which the aircraft is to be positioned, or for maintaining the aircraft in a horizontal plane, despite changes in atmospheric conditions, which might otherwise disturb the orientation of the aircraft.

Turning now to FIG. 3, there is shown an alternate configuration for aircraft 100. In this configuration, the power source for rotors 2 is located within the fuselage 1, and may be a single power source driving all of the sets of rotor blades 2, or individual power plants for each of the vertical thrust systems. Each of the horizontal thrust engines 6 is supported by a respective pylon 206, which powers the drive elements for the respective rotor blades 2.

Figure 22:
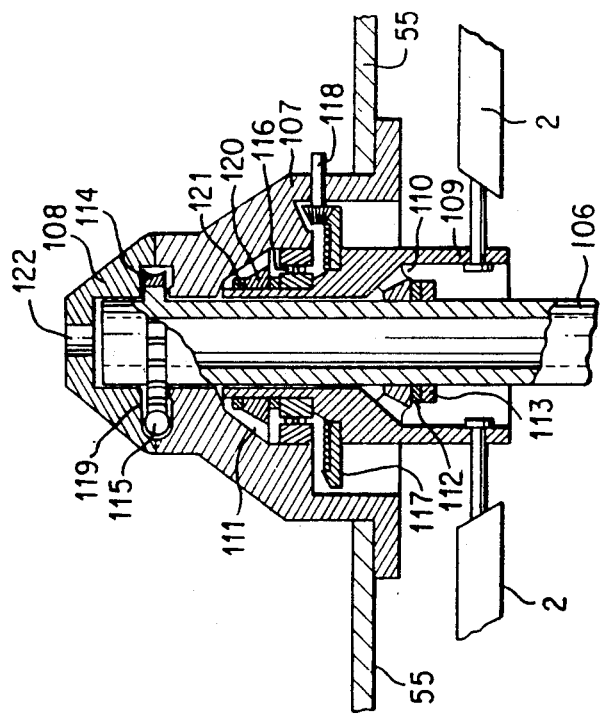
FIG. 22 is an enlarged cross-sectional detail of a rotor drive and horizontal thrust engine support; and, FIG. 23 is an enlarged cross-sectional detail of a rotor drive and gyration assembly.

Referring now to FIG. 22, there is shown, the rotor drive assembly and pivotal support for a horizontal thrust engine 6. The rotor blades 2 are pivotably coupled to the hub 109. The pitch adjusting mechanism for the rotor blades 2 is omitted from this drawing, for purposes of simplification, since such mechanisms are well known in the art for pitch adjustment of propeller blades, there is no requirement to discuss such mechanisms in detail. Power is transmitted from a central motive power source by means of a beveled pinion gear coupled to the drive shaft 118 for meshing engagement with the beveled ring gear 117, which is fixedly coupled to the hub 109. The horizontal thrust engine 6 is supported by the hollow shaft 106, which is rotated by means of the gear 114 coupled to the shaft 106. A worm gear 115 is coupled to a servomotor (not shown), for controlling the position of shaft 106, and thereby the direction to which the thrust from the engine 6 is directed. The fuel lines and control cables for engine 6 are passed through the opening 122, formed in the gear cover 108, and through the hollow passage formed in the shaft 106. The hub 109 is pivotedly supported by the shaft 106 through the beveled ring 112 and bearing 110, secured by the adjustment means 113. The hub 109 is pivotedly supported within the rotor drive case 107 by means of the ball bearing assembly 116, the beveled ring 120, and respective bearing 111, secured by the end plate adjustment means 121. The rotor drive case 107 is secured to a fuselage structural member 55 (fuselage bottom surface 205 is omitted for clarity).

Referring now to FIG. 4, there is shown another configuration for the VTOL aircraft 100. In this variation, the engines for supplying both vertical and horizontal thrust are enclosed within fuselage 1. The horizontal thrust engines are equally spaced about the periphery of the fuselage 1, having respective exhaust nozzles 8 extending therethrough. The vertical thrust motive power source, or sources, have their air intake openings formed in the upper surface of the fuselage (not shown), such that aircraft 100 is capable of operating in dust laden environments, such as during low altitude flight above the desert, or other sandy environments.

In order to obtain vertical ascent of aircraft 100 to very high altitudes, which would otherwise be unobtainable utilizing rotor blades 2, since the air density would be insufficient to generate the necessary thrust, aircraft 100 may be provided with a plurality of rocket engines having nozzles 10 extending through the bottom surface 205 of fuselage 1. The rocket engines are symmetrically located in the central portion of the fuselage for adding the necessary thrust to propel the vehicle to the desired altitude.

Rotor blades 2 are coupled to the motive power source through shafts extending through the annular rotatable plate 5, utilized for gyration of the rotor assemblies.

It is understood that this type of aircraft may also be designed without gyration and without the annular plate 5 as is clearly shown in FIG. 3 in order to lessen the complexity of the aircraft assemblage and to further diminish any dust disadvantages.

Referring now to FIG. 5, there is shown the airflow patterns for a VTOL aircraft 100' wherein the fuselage 1 is enclosed within a suction mantle 11. The mantle 11 surrounds the fuselage 1, with an opening 208 being formed at the upper portion through which the pilot's cabin 7 protrudes. An annular space through which the suction airflow S passes is defined by the opening 208 and the fuselage 1. As before, the suction generated by the rotor blades 2 create a low pressure region above the fuselage, in this case above the opening 208. As previously discussed, the suction generated aerodynamic lift is created by the pressure differential between the upper and lower surfaces of the fuselage, a high pressure region being formed by the centrally disposed airflow column R which forms a high pressure layer of air in juxtaposition with the central portion of the fuselage bottom surface. Thus the thrust of the downward directed airflow D is augmented by the suction generated aerodynamic lift, resulting from the low pressure region above the opening 208 and the high pressure region beneath the fuselage 1.

Referring now to FIGS. 5, 6, and 8, there is shown VTOL aircraft 100' having a suction mantle 11 adapted to utilize the thrust from rotors 2 for both horizontal and vertical flight. The easiest method by which the rotor's thrust can be utilized to propel the vehicle in an other than vertical direction is to change the balance of thrust between opposed rotors. Thus, by reducing the thrust of the rotor adjacent the desired direction of flight, and increasing the thrust of the rotor in a diametrically opposed position, the aircraft 100' will pitch downward, and be propelled in a horizontal direction. The generation of differential thrust between the multiple rotors is easily accomplished by adjusting the pitch of the rotor blades 2, by conventional means, under computer control. Once the attitude of the aircraft has been changed, the thrust of the rotors is effectively vectored, and all can be controlled to propel the vehicle in the desired direction. The aircraft shown in FIG. 5 may be airborne by only thrust of its rotors and augmented by suction generated aerodynamic lift. The use of this embodiment aircraft may be limited to lifting and hovering, as for a flying crane, as well as for short of mid-distance travelling.

In a preferred arrangement, as shown in FIGS. 6 and 8, the mantle 11 is adapted for re-routing the airflow of rotors 2, in order to propel the vehicle in a substantially non-vertical direction. In order to achieve this airflow, the gyration of rotors 2 have to be used during horizontal flight, to maintain air at a high pressure below rotors 2. Here again, the mantle 11 with closing devices 14 and 15 in a closed position, defines a lifting body for supplying aerodynamic lift for the craft as it is propelled in other than a substantially vertical direction. The mantle 11 is coupled to the fuselage 1 by means of a plurality of structural members 147, disposed at the bottom of mantle 11, and a plurality of structural members similarly disposed at the upper portion, not shown. The lower portion of mantle 11 is provided with a plurality of discharge orifices 16, through which the downwash airflow from the rotors is discharged to generate horizontally directed thrust. The discharge orifices 16 are selectively opened in synchronism with the closing of the discharge opening area, between the mantle and the return airflow directing structure 210, centrally disposed beneath the fuselage, to be further described in following paragraphs. The annular opening in the mantle below the rotor blades 2 is provided with a closing device 14, having a plurality of shutter panels 30, which permit the gradual transfer of thrust from a vertical direction to a horizontal one. Similarly, an intake orifice 148 can be selectively opened by means of the telescoping panels 149, to permit the suction airflow to enter from the direction of travel. As was the case for the lower discharge opening, the upper mantle opening 208 is provided with a closing device 13 of similar construction to that of closing device 14.

During the transition from hovering to horizontal flight, the thrust of the rotors must be temporarily increased, to provide additional thrust for initiation of the horizontal flight.

Once in a substantially non-vertical direction of flight, there is no requirement for rising air to be directed upward through the central portion of the mantle 11, defined by the structure 210. The rising airflow directing structure 210 is coupled to the fuselage by means of a plurality of structural members 19, and fitted with a closing device 15 having a plurality of shutter panels 22 for closing the opening defined thereby, when the discharge orifices 16 are utilized.

Figure 23:
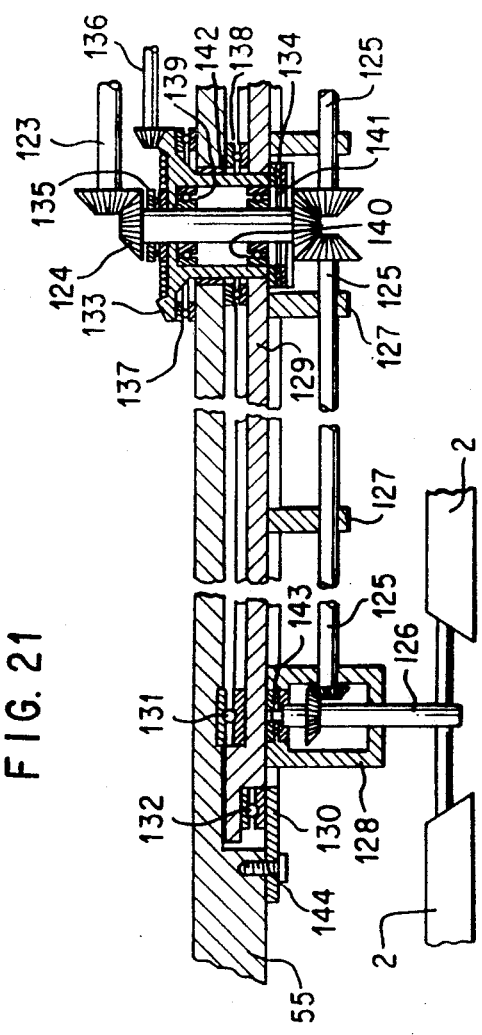

The mechanics for accomplishing the gyration is shown in FIG. 23, wherein the motive power for the rotors 2 is supplied by an input shaft 123 for coupling with one end of the pinion shaft 124 by means of a bevel gear arrangement. Beveled gears are utilized to distribute the power from the opposing end of pinion shaft 124 through a plurality of horizontal shafts 125, each of the horizontal shafts 125 being drivingly coupled to a respective rotor shaft 126, preferably by a bevel gear arrangement. Each of the horizontal drive shafts 125 are supported by appropriate bearings in the support elements 127 disposed in spaced parallel relation on the gyration plate 129. The rotor shafts 126 are bearing supported and extend through a rotor housing 128 which is coupled to the gyration plate 129.

The pinion shaft 124 is rotatably supported within the hollow beveled ring gear assembly 133, which is in turn rotatably supported by the fuselage structural member 55. Ring gear assembly 133 is supported by the structural member through the bearing members 137 and 142, respectively coupled therebetween. Pinion shaft 124 is supported by the thrust bearings 134 and 135, as well as bearings 139 and 140.

The gyration plate 129 is fixedly coupled to the hollow beveled ring gear assembly 33 and supported through bearings 131, 132, and 138 to the structural member 55. The bearings 131 and 138 provide a direct interface between the gyration plate 129 and the structural member 55, whereas the bearing 132 supports the gyration plate 129 through its interface with the gyration bearing cover plate 130, which is coupled to the structural member 55 by means of fasteners 144. Thus, the gyration plate 129 is rotatably driven by means of the hollow beveled ring gear assembly 133, which is driven by the drive shaft 136, supplying power from the central motive power source, but at a lower RPM than that of drive shaft 123.

The arrangement shown in FIGS. 6 and 8 provides a unique and new maneuvering feature which is unknown in current aircraft. Such new maneuvering feature allows for deceleration, termination of displacement, and flying backward in the same path at the same altitude. Such maneuvering may be achieved by reversing the direction of suction and discharge airflows and by simultaneously regulating the action through the elements 13, 14 and 15 in relation to the changing speed in order to maintain the same altitude and attitude of the aircraft. This new maneuvering ability may be utilized in civilian aircraft as a final maneuvering action to avoid collision with another aircraft or edifice. Radar warning would automatically initiate evasive maneuvers and such may be controlled by a computer processor in a preprogrammed sequence.

In order to obtain and maintain a supply of compressed air below the rotors, between the plane of gyration and the closing device 14, the particular number of blades in the rotors may be considerably larger than in previously described embodiments.

The bottom of lower rim of the suction mantle 11 may be equipped with hardened rubber pads on which the craft may rest subsequent to landing. During the landing maneuver, the ground effect will slow the craft in the same manner as is provided in a hovercraft. A landing onto a body of water may be a standard feature in aircrafts according to this inventive concept for special purposes and objectives if a needed protection against corrosion and waterproofing is provided.

Referring now to FIG. 9, there is shown the structure of the closing device 15 for the rising airflow directing structure 210. The rising airflow directing structure 210 is formed by a pair of cylindrical walls 20 and 21 concentrically arranged with an annular top wall 41 and annular bottom wall 40 extending therebetween. The space between the outer wall 20 and inner wall 21 is utilized to contain the closure control servos 23, each drivingly coupled to a respective shutter panel 22. The outer wall 20 is provided with a plurality of equally spaced through openings 234, for receiving the down draft shutter operating servos, as will be described in following paragraphs.

Referring now to FIG. 14, there is shown an enlarged detail of the closure control servo 23 of the closing device 15. The shutter panel 22 is fixedly coupled to a shaft 37, such that rotation of shaft 37 rotates the shutter blade 22 therewith. Shaft 37 includes a portion 212 having gear teeth formed therein for meshingly interfacing with the rack 214, formed in the cylinder shaft 36. Shaft 36 is coupled to a piston 35, which is bi-directionally displaceable within the cylinder 34. Cylinder 34 is a double-acting fluid operated cylinder, having fluid input/output ports 33 disposed at opposing ends thereof. Each of the shafts 37 for a respective shutter blade 22 is supported on opposing ends of the blade 22, through apertures formed in the inner wall 21.

Referring now to FIG. 10, there is shown an enlarged detail of the downwash closing system 14, wherein the rotational angle of each of the shutter blades 30 is controlled by a respective servo 25, comprising a double-acting cylinder having a piston 26 coupled to a shaft 27. The shaft 27 is slidingly coupled to the blade 30 by means of a plurality of splines formed on shaft 27, which engage slotted bushings 28, disposed on opposing ends of blade 30. The distal end of shaft 27 is provided with a pair of helical lugs 29 for imparting a rotational moment to shaft 27, as it is slidingly displaced by piston 26. Thus, the blade 30 is rotated by virtue of the splined connection with shaft 27, as shaft 27 is slidingly displaced through blade 30 and rotated by the lugs 29. A pair of bearings 31 and 32, disposed on opposing ends of blade 30 insure the free rotation thereof responsive to the rotation of shaft 27.

In the closed position, shown in FIG. 11, each of the shutter blades 30 are arranged such that the transverse axis of each blade lies in a single continuous plane, thereby closing the annular opening between the mantle 11 and the structure 210. As shown in FIGS. 12 and 13, rotation of the blades from the position wherein the transverse axes are coplanar to one in which they are all substantially parallel, provides an open annular path for the free flow of discharge air.

Figure 16:
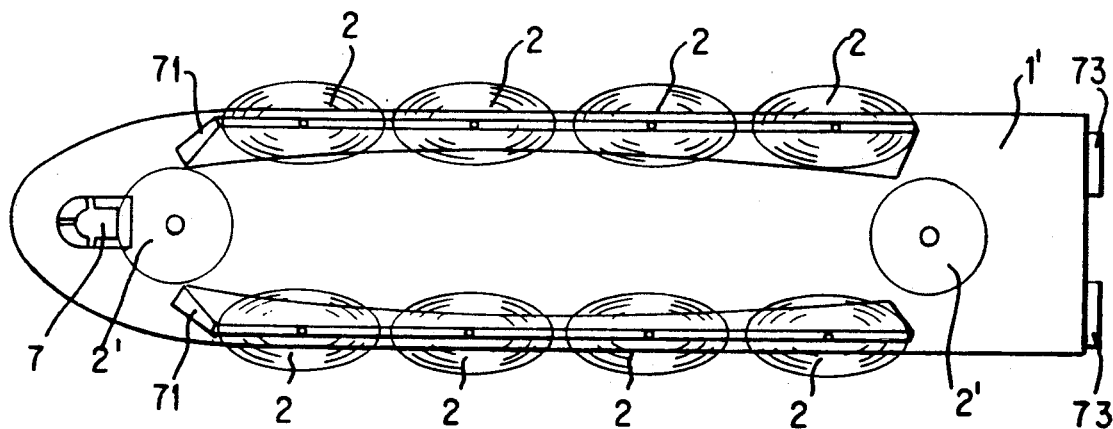
FIG. 16 is a bottom view of the VTOL aircraft embodiment of FIG. 15.

Referring now to FIGS. 15 and 16, there is shown an alternate fuselage configuration, the fuselage 1' having a longitudinally extended fuselage contour of the cigar-shaped type. As in the saucer-shaped fuselage, the aircraft is provided with a plurality of sets of rotor blades 2 disposed at least partially beneath the lower surface of the fuselage. On opposing sides of the aircraft fuselage 1', a plurality of symmetrically spaced sets of rotor blades 2 are extended from a rotor base 71. In order to form a wall of downwash airflow about the central rising airflow path, a pair of sets of rotor blades 2' are disposed on opposing ends of the fuselage and centered thereon. The rotor blades 2 on opposing sides of the fuselage are angled to maximize the suction generated aerodynamic lift, the principles of which having previously been described. The fuselage 1' may be provided with horizontal thrust engines, having exhaust nozzles 73 located at the rear of the fuselage for providing longitudinally directed thrust. The fuselage 1', having a lifting body contour, may be provided with a plurality of windows 74 and access doors 52, of the type normally found in commercial aircraft.

Figure 17:
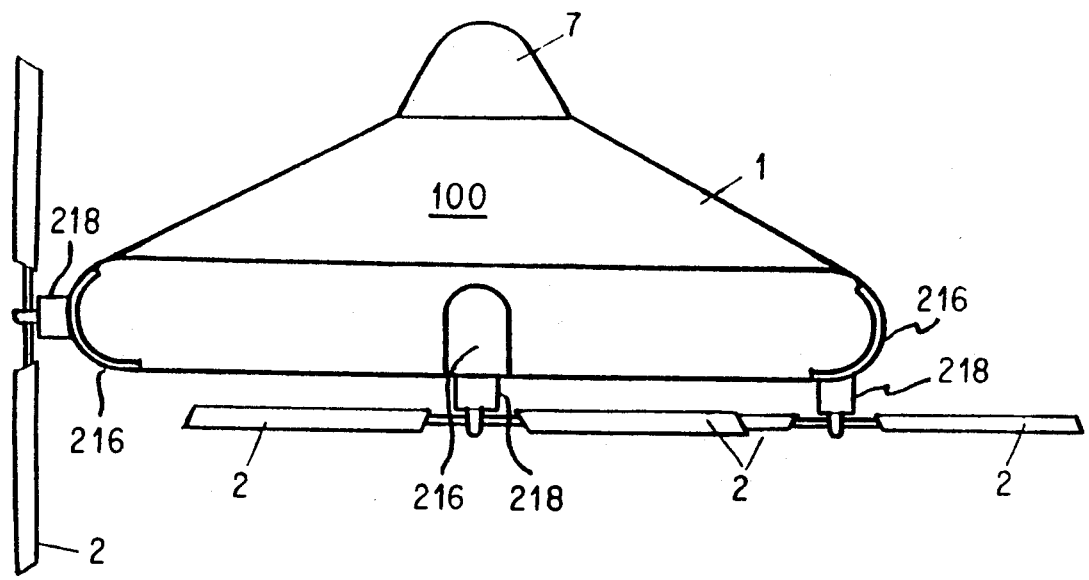
FIG. 17 is an elevation view of a first embodiment of the VTOL aircraft having pivotable engine units.

Referring now to FIG. 17, there is shown an alternate positioning system for the saucer-shaped fuselage 1. Each of the rotor drive pylons 218 is coupled to the fuselage 1 by means of a pivoting structure 216 for angularly displacing the thrust vector of the respective sets of rotor blades 2. Thus, each of the pylons 218 may be rotated within an angular range of 30degrees –45 degrees for maximizing the suction generated aerodynamic lift, or any one or more pylons 218 can be rotated up to 90 degrees for providing vectored thrust to propel the aircraft 100 in a predetermined direction. Here again, as the vehicle transitions between thrust generated lift to the aerodynamic lift of the lifting body, the thrust from the downwardly directed rotors is gradually reduced as the horizontally directed rotor thrust is increased, wherein the lift created by the downwardly directed rotors is replaced by the lift of fuselage 1.

Figure 19:
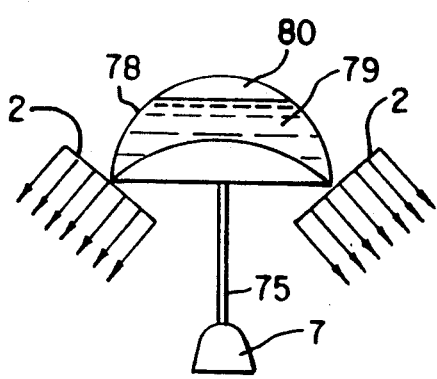
FIG. 19 is a schematic diagram of the thrust vectors for vertical takeoff and landing of the embodiment of FIG. 18.
Figure 20:
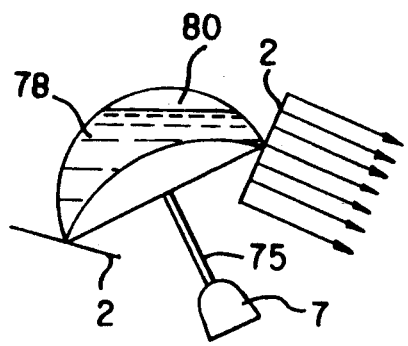
FIG. 20 is a schematic diagram for the VTOL aircraft embodiment of FIG. 18 showing thrust vectors for horizontal flight.
Figure 18:
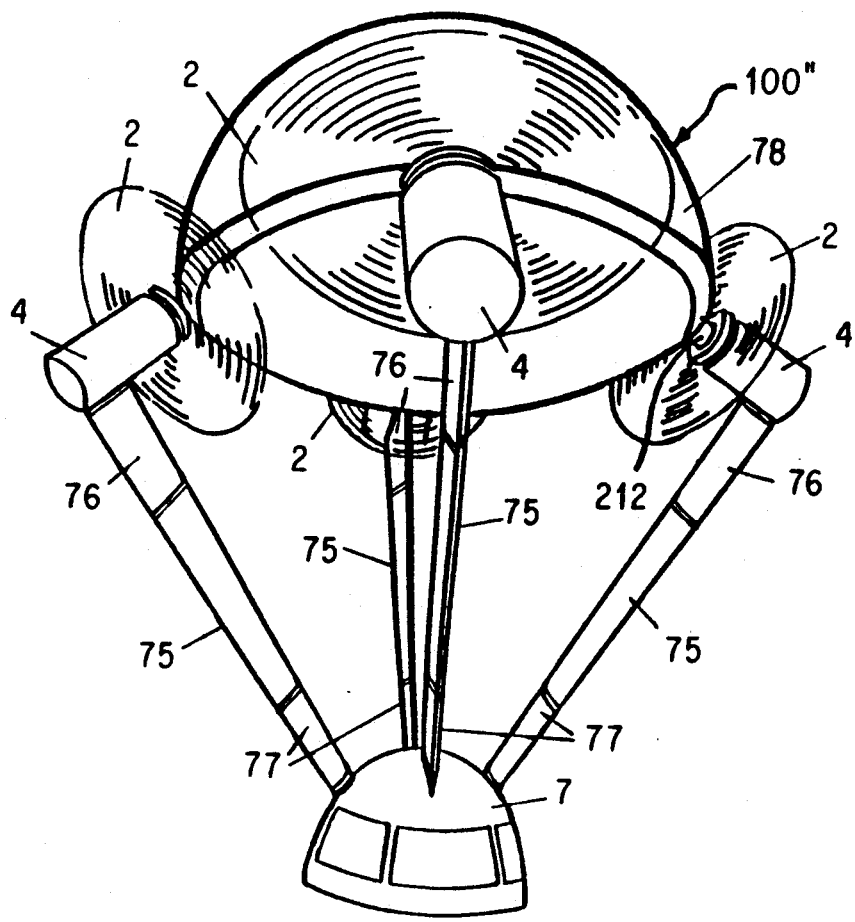
FIG. 18 is a fourth embodiment of the VTOL aircraft having a concave fuselage bottom surface.

Referring now to FIGS. 18–20, there is shown a VTOL aircraft 100" having a concave bottom surface for improving the flow path of the rising suction airflow which forms the high pressure region on the bottom fuselage surface. As shown, each of the rotor blade sets 2 are driven by a respective engine 4, coupled to the fuselage 78 by means of the hollow support 212. The pilot's cabin 7 is supported by means of a plurality of girders 75 extending between cabin 7 and the engine housings. Each of girders 75 is provided with stabilizers 76 and 77 which are in the downwash and suction airflow paths, and are utilized for rotating the craft axially about its vertical axis.

The overall profile of girders 75 are aerodynamically contoured and rotationally adjustable to minimize aerodynamic resistance. A downwash from the rotors will be pointed away from the center zone below the aircraft, which is a desirable feature in crafts for rescue missions, or other special purposes and objectives at the discretion of the user.

Since the pilot's cabin is disposed separate from the fuselage 78, fuselage 78 may be utilized for storage of fuel 79, in either a single large tank, or preferably in separate fuel tanks for each of the engines 4. The singular tank, or each of multiple tanks are provided with an air cushion 80. Here again, the directional control of the aircraft is provided by varying the ratio of thrust between opposed sets of rotor blades 2, the relative thrust imbalance providing displacement of the vehicle in a direction of the resultant thrust vector.

Figure 21:
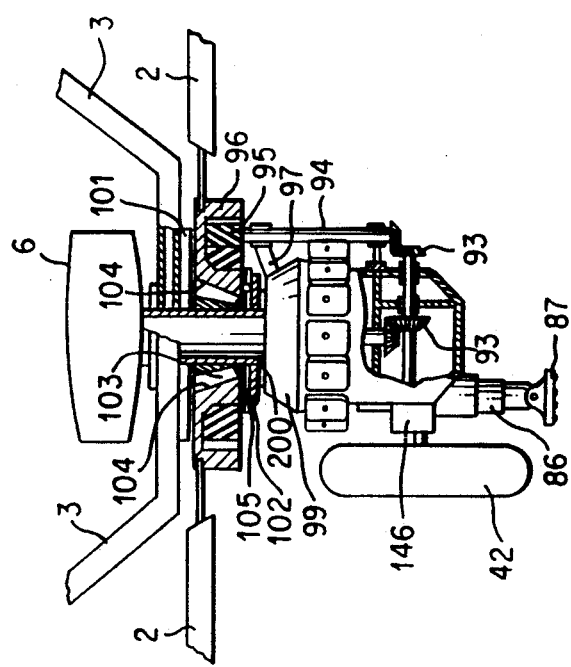
FIG. 21 is an enlarged detail in partial cutaway of an engine mounting structure.

Referring now to FIG. 21, there is shown a schematic view of a power unit for use with an aircraft configuration having a sub-fuselage frame 3, from which the vertical and horizontal thrust systems are supported. The horizontal thrust engine 6 is coupled to the sub-fuselage frame 3 by means of the hollow holding member 200, which also supports the vertical thrust engine 99. The fuel lines and control cabling passes through the interior cavity of the frame 3 and into an opening formed in the wall of the engine holder 200, for respective distribution to both engines. The rotor blades 2 are driven by rotation of the hub 96. Hub 96 includes an internal helical toothed ring gear which is meshingly engaged by a helical pinion gear 95 driven by the vertical drive shaft 94. Vertical drive shaft 94 is supported by standoffs 97, and drivingly coupled to engine 99 by means of the bevel gear sets 93. As shown, the output of engine 99 is also coupled to a wheel 42 through a transmission 146 for propelling the vehicle on the ground. Hub 96 is pivotably supported by the hollow engine holder 200 through the bearing support 103, having an inner ring 104, which bears on an upper hub casing 101. Hub 96 is supported on the opposing end by a thrust bearing 105, which bears on the lower hub casing 102.

In addition to the landing gear wheel 42, the system may incorporate a telescopically extendable landing leg 86 having a swiveled landing pad 87 pivotedly coupled thereto. The landing leg 86 may be hydraulically operated and cushioned through the use of airsprings.

Although the invention has been described in connecting with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A VTOL aircraft, comprising:
   a fuselage having an upper and a lower surface portion, said upper and lower surface portions together forming a predetermined surface contour defining a lifting body;
   first propulsion means coupled to said lower surface of said fuselage for displacing said aircraft in a substantially vertical direction while using a suction effect of said first propulsion means for generating an aerodynamic lift for augmenting a total lifting thrust by displacing air from a central zone below said fuselage to allow additional air to be inserted by atmospheric pressure differential and to collide with said central zone portion of said lower surface of said fuselage whereby a high pressure region is formed adjacent said central lower surface portion of said fuselage, and by simultaneously displacing air from a zone above said fuselage whereby a region of a lower pressure is formed above said fuselage which in combination provides said suction generated lift said first propulsion means including a plurality of rotatably driven rotors disposed about a perimeter portion of said fuselage in spaced relation each to another, each of said rotors having an axis of rotation disposed a predetermined distance from a perimeter edge surface of said fuselage, each of said rotors being positionally located a predetermined distance from said lower surface of said fuselage; and, control means for regulating said suction generated aerodynamic lift during vertical and horizontal flight.

2. The VTOL aircraft as recited in claim 1 where said first propulsion means includes means for rotatably driving each of said rotors.

3. The VTOL aircraft as recited in claim 2 where said rotatable drive means is disposed within said fuselage.

4. The VTOL aircraft as recited in claim 2 where said rotatable drive means includes at least three engines, each of said engines being coupled to a respective one of said rotors.

5. The VTOL aircraft as recited in claim 1 where said first propulsion means includes means for rotatably displacing each of said rotors with respect to a vertically directed central axis of said fuselage, each of rotors being maintained in said spaced relationship each to the other.

6. The VTOL aircraft as recited in claim 5 where said means for rotatably displacing each of said rotors displaces said rotors in a direction opposite to a respective rotational direction of said rotors.

7. The VTOL aircraft as recited in claim 1 further comprising second propulsion means for displacing said aircraft in a non-vertical plane.

8. The VTOL aircraft as recited in claim 7 where said second propulsion means includes at least one source of thrust coupled to said fuselage.

9. The VTOL aircraft as recited in claim 8 where said source of thrust is pivotally coupled to said fuselage for selected rotation about at least one axis.

10. The VTOL aircraft as recited in claim 7 where said second propulsion means includes means for rotatably displacing said first propulsion means with respect to said vertically directed central axis of said fuselage while maintaining said spaced relation between said first propulsion means.

11. The VTOL aircraft as recited in claim 7 further comprising a suction mantle disposed in spaced substantial concentric relationship with a perimeter portion of said fuselage for directing the air flow from said area juxtaposed to said upper surface of said fuselage toward said rotors.

12. The VTOL aircraft as recited in claim 11 where said suction mantle includes (1) an upper opening defining a first air intake, (2) a lower annular opening defining an exhaust outlet, and (3) a centrally disposed lower opening defining a second air intake.

13. The VTOL aircraft as recited in claim 12 where said second propulsion means includes (1) an alternate air intake opening formed in said suction mantle being selectively opened for forming a low pressure region in juxtaposition thereto, and (2) at least one alternate air exhaust opening formed in said suction mantle being selectively opened for directing air displaced by said first propulsion means.

14. The VTOL aircraft as recited in claim 13 where said second propulsion means further includes means for selectively restricting said first air intake disposed within said upper opening of said suction mantle.

15. The VTOL aircraft as recited in claim 14 where said second propulsion means further includes means for selectively restricting said exhaust outlet disposed within said lower annular opening of said suction mantle.

16. The VTOL aircraft as recited in claim 1 where said lower surface portion of said fuselage is substantially planar.

17. The VTOL aircraft as recited in claim 1 where said lower surface portion of said fuselage has a concave cross-sectional contour.

18. The VTOL aircraft as recited in claim 17 further comprising a pilot's cabin rigidly suspended from said fuselage.

19. The VTOL aircraft as recited in claim 1 including means for simultaneously tilting said rotors to a predetermined position for further augmenting said suction generated aerodynamic lift.

20. The VTOL aircraft as recited in claim 1 including means for displacing at least one rotor to a substantially vertical position for generating thrust for substantially horizontal flight.

21. The VTOL aircraft as recited in claim 1 including means for locating at least one engine internal to said fuselage for generating vertical thrust forces above a predetermined altitude when air density is not sufficient to support said aerodynamic lifting force.

* * * * *

UNITED STATES PATENT AND TRADEMARK OFFICE
CERTIFICATE OF CORRECTION

PATENT NO. : 5,178,344
DATED : January 12, 1993
INVENTOR(S) : Vaclav Dlouhy

It is certified that error appears in the above-identified patent and that said Letters Patent is hereby corrected as shown below:

Column 3, Line 64; before the word "birds" delete the word "a" and insert the word --of--;

Column 5, Line 39; delete the words "systems. In" and insert therefor the words --systems, in--;

Column 5, Line 59; delete the word "an" and insert therefor the word --and--.

Signed and Sealed this

Second Day of November, 1993

Attest:

BRUCE LEHMAN

Attesting Officer   Commissioner of Patents and Trademarks